US012762404B2

(12) United States Patent
Marfoq et al.

(10) Patent No.: US 12,762,404 B2
(45) Date of Patent: Oct. 13, 2026

(54) IMAGE RETRIEVAL SYSTEM

(71) Applicant: SMITHS DETECTION FRANCE S.A.S., Vitry sur Seine (FR)

(72) Inventors: Othmane Marfoq, Vitry sur Seine (FR); Alireza Moshayedi, Vitry sur Seine (FR); Najib Gadi, Vitry sur Seine (FR)

(73) Assignee: SMITHS DETECTION FRANCE S.A.S., Vitry-sur-Seine (FR)

(*) Notice: Subject to any disclaimer, the term of this patent is extended or adjusted under 35 U.S.C. 154(b) by 251 days.

(21) Appl. No.: 18/775,470

(22) Filed: Jul. 17, 2024

(65) Prior Publication Data

US 2024/0370726 A1 Nov. 7, 2024

Related U.S. Application Data

(63) Continuation of application No. 17/640,487, filed as application No. PCT/GB2020/052107 on Sep. 3, 2020, now abandoned.

(30) Foreign Application Priority Data

Sep. 6, 2019 (GB) ..................................... 1912844

(51) Int. Cl.
*G06N 3/08* (2023.01)
*G06F 16/53* (2019.01)
(Continued)

(52) U.S. Cl.
CPC ............... *G06N 3/08* (2013.01); *G06F 16/53* (2019.01); *G06F 16/56* (2019.01); *G06V 10/454* (2022.01);
(Continued)

(58) Field of Classification Search
CPC ........ G06N 3/08; G06N 3/045; G06N 3/0464; G06N 3/047; G06N 3/09; G06F 16/53;
(Continued)

(56) References Cited

U.S. PATENT DOCUMENTS

2013/0101172 A1* 4/2013 Parikh ..................... G06T 7/001 382/104
2018/0336672 A1 11/2018 Perticone et al.

FOREIGN PATENT DOCUMENTS

CN 103917862 A 7/2014
CN 109919192 A 6/2019

OTHER PUBLICATIONS

Zhang, Hang, Jia Xue, and Kristin Dana. “Deep ten: Texture encoding network.” Proceedings of the IEEE conference on computer vision and pattern recognition. 2017. (Year: 2017).*
(Continued)

*Primary Examiner* — Gregory A Morse
*Assistant Examiner* — Renae A Bitor
(74) *Attorney, Agent, or Firm* — Armstrong Teasdale LLP

(57) ABSTRACT

In some examples, it is disclosed a method for generating an image retrieval system configured to rank a plurality of images of cargo from a dataset of images, in response to a query corresponding to an image of cargo of interest generated using penetrating radiation. The method may involve obtaining a plurality of annotated training images including cargo, each of the training images being associated with an annotation indicating a type of the cargo in the training image, and training the image retrieval system by applying a deep learning algorithm to the obtained annotated training images. The training may involve applying, to the annotated training images, a feature extraction convolutional neural network, and applying an aggregated generalized mean pooling layer associated with image spatial information.

20 Claims, 6 Drawing Sheets

(51) Int. Cl.
*G06F 16/56* (2019.01)
*G06V 10/44* (2022.01)
*G06V 10/74* (2022.01)
*G06V 10/774* (2022.01)
*G06V 10/82* (2022.01)
*G06V 20/52* (2022.01)
*G06V 30/424* (2022.01)

(52) U.S. Cl.
CPC .......... *G06V 10/761* (2022.01); *G06V 10/774* (2022.01); *G06V 10/82* (2022.01); *G06V 20/52* (2022.01); *G06V 30/424* (2022.01)

(58) Field of Classification Search
CPC ............... G06F 16/56; G06F 18/24133; G06F 18/2415; G06F 16/538; G06F 16/583; G06V 10/454; G06V 10/761; G06V 10/774; G06V 10/82; G06V 20/52; G06V 30/424; G06V 2201/05; G01V 5/22
See application file for complete search history.

(56) References Cited

OTHER PUBLICATIONS

Jun, HeeJae, et al. "Combination of multiple global descriptors for image retrieval." arXiv preprint arXiv:1903.10663 (2019). (Year: 2019).*
Hang Zhang et al: "Deep TEN: Texture Encoding Network", [arvix.org], Cornell University Library, 201 Olin Library Cornell University, Ithaca, NY 14853, Dec. 8, 2016 (Dec. 8, 2016), XP080737935, DOI 10.1109/CVPR.2017.309, pp. 2896-2900.
International Search Report and Written Opinion, PCT/GB2020/052107, Dec. 15, 2020, 16 pages.
U.K. Search Report under Section 17(5), Application No. GB1912844.6, Feb. 17, 2020, 3 pages.
HeeJae Jun et al., "Combination of Multiple Global Descriptors for Image Retrieval", arxiv.org, arXiv:1903.10663v1 [cs.CV], Mar. 26, 2019, pp. 1-10.

* cited by examiner

IMAGE RETRIEVAL SYSTEM

CROSS REFERENCE TO RELATED APPLICATIONS

This patent application is a continuation of U.S. Non-Provisional patent application Ser. No. 17/640,487, filed Mar. 4, 2022, which is a National Stage Entry of PCT/GB2020/052107 filed on Sep. 3, 2020, which claims priority to GB Application No. 1912844.6 filed on Sep. 6, 2019, the disclosures of which are hereby incorporated by reference herein in their entirety as part of the present application.

FIELD OF THE DISCLOSURE

The disclosure relates but is not limited to generating an image retrieval system configured to rank a plurality of images of cargo from a dataset of images, in response to a query corresponding to an image of cargo of interest generated using penetrating radiation. The disclosure also relates but is not limited to ranking a plurality of images of cargo from a dataset of images, based on an inspection image corresponding to a query. The disclosure also relates but is not limited to producing a device configured to rank a plurality of images of cargo from a dataset of images generated using penetrating radiation. The disclosure also relates but is not limited to corresponding devices and computer programs or computer program products.

BACKGROUND

Inspection images of containers containing cargo may be generated using penetrating radiation. In some examples, a user may want to detect objects corresponding to a cargo of interest on the inspection images. Detection of such objects may be difficult. In some cases, the object may not be detected at all. In cases where the detection is not clear from the inspection images, the user may inspect the container manually, which may be time consuming for the user.

SUMMARY

Aspects and embodiments of the disclosure are set out in the appended claims. These and other aspects and embodiments of the disclosure are also described herein.

Any feature in one aspect of the disclosure may be applied to other aspects of the disclosure, in any appropriate combination. In particular, method aspects may be applied to device and computer program aspects, and vice versa.

Furthermore, features implemented in hardware may generally be implemented in software, and vice versa. Any reference to software and hardware features herein should be construed accordingly.

BRIEF DESCRIPTION OF DRAWINGS

Embodiments of the present disclosure will now be described, by way of example, with reference to the accompanying drawings, in which.

In the figures, similar elements bear identical numerical references.

DETAILED DESCRIPTION OF EXAMPLE EMBODIMENTS

The disclosure discloses an example method for generating an image retrieval system configured to rank a plurality of images of cargo from a dataset of images. The ranking is performed in response to a query corresponding to an image of cargo of interest generated using penetrating radiation (e.g. X-rays, but other penetrating radiation is envisaged). The cargo of interest may be any type of cargo, such as food, industrial products, drugs or cigarettes, as non-limiting examples.

The disclosure also discloses an example method for ranking a plurality of images of cargo from a dataset of images, based on an inspection image corresponding to a query.

The disclosure also discloses an example method for producing a device configured to rank a plurality of images of cargo from a dataset of images generated using penetrating radiation.

The disclosure also discloses corresponding devices and computer programs or computer program products.

The image retrieval system may enable an operator of an inspection system benefitting from an existing dataset of images and/or existing textual information (such as expert reports) and/or codes associated with the ranked images. The image retrieval system may enable enhanced inspection of the cargo of interest.

The image retrieval system may enable the operator of the inspection system benefitting from automatic outputting of textual information (such as cargo description reports, scanning process reports) and/or codes associated with associated with the cargo of interest.

Figure 1:
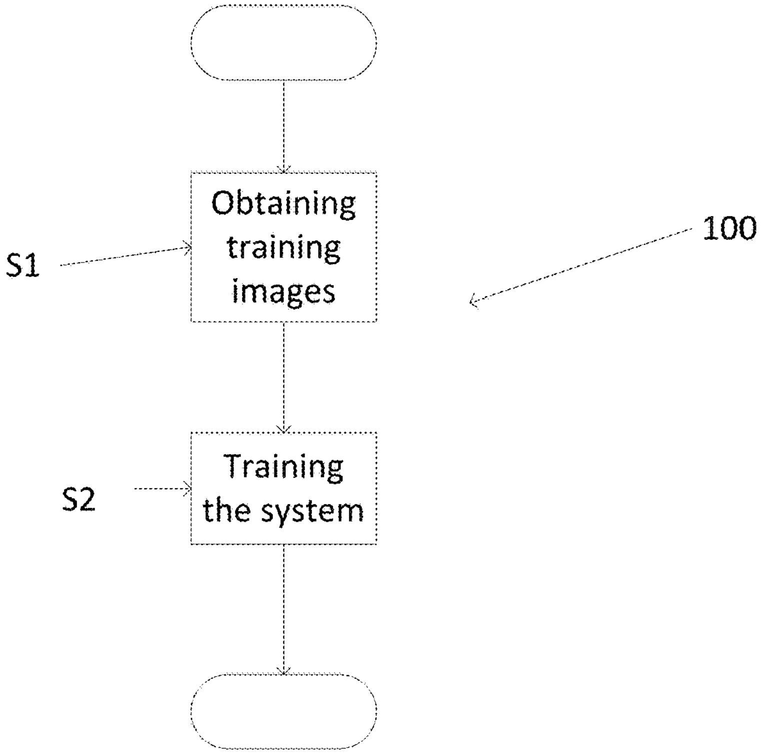
FIG. 1 shows a flow chart illustrating an example method according to the disclosure.
Figure 2:
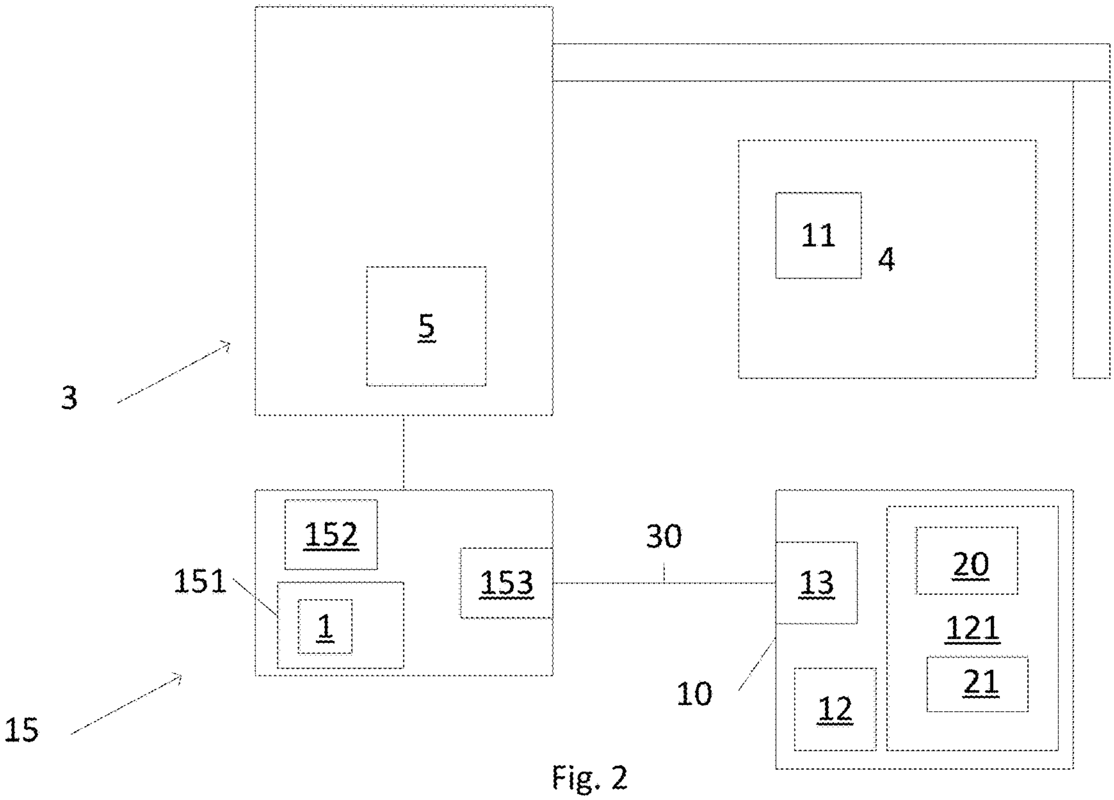
FIG. 2 schematically illustrates an example system and an example device configured to implement the example method of FIG. 1.
Figure 3:
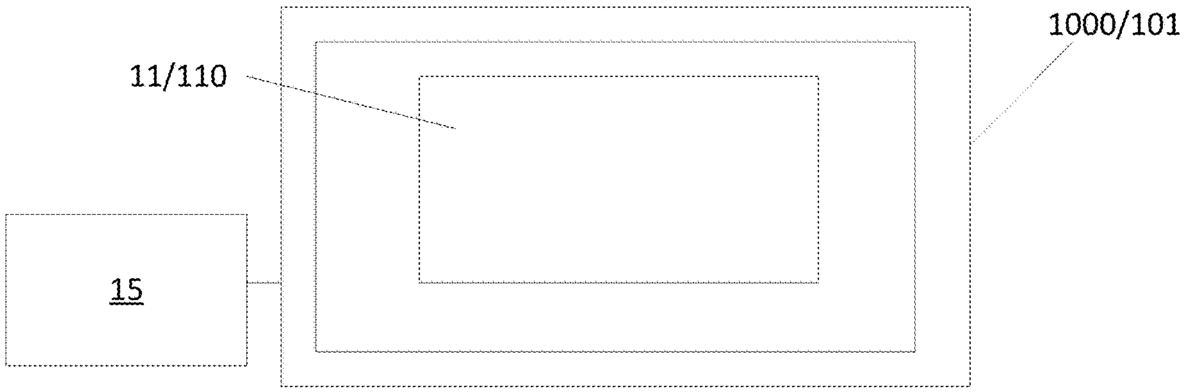
FIG. 3 illustrates an example inspection image according to the disclosure.
Figure 6:
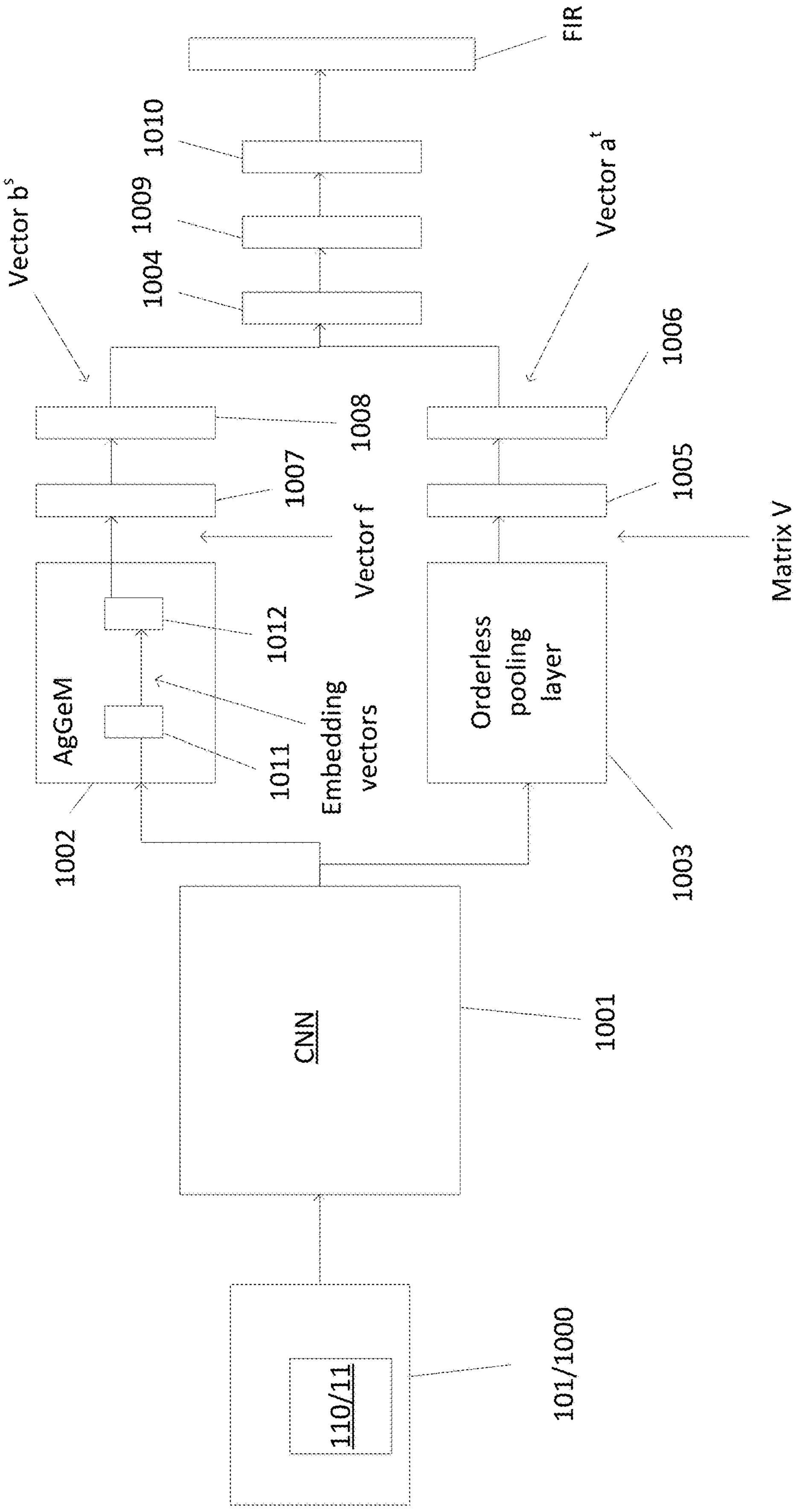
FIG. 6 schematically illustrates an example image retrieval system configured to implement e.g. the example method of FIG. 1.

FIG. 1 shows a flow chart illustrating an example method 100 according to the disclosure for generating an image retrieval system 1 illustrated in FIG. 6. FIG. 2 shows a device 15 configurable by the method 100 to rank a plurality of images of cargo from a dataset 20 of images generated using penetrating radiation, in response to a query corresponding to an inspection image 1000 (shown in FIGS. 3 and 6) including cargo 11 of interest generated using penetrating radiation. The inspection image 1000 may be generated using penetrating radiation, e.g. by the device 15.

The method 100 of FIG. 1 includes in overview:

- obtaining, at S1, a plurality of annotated training images 101 (shown in FIGS. 3 and 6) including cargo 110, each of the training images 101 being associated with an annotation indicating a type of the cargo 110 in the training image 101; and training, at S2, the image retrieval system 1 by applying a deep learning algorithm to the obtained annotated training images 101.

Figure 9:
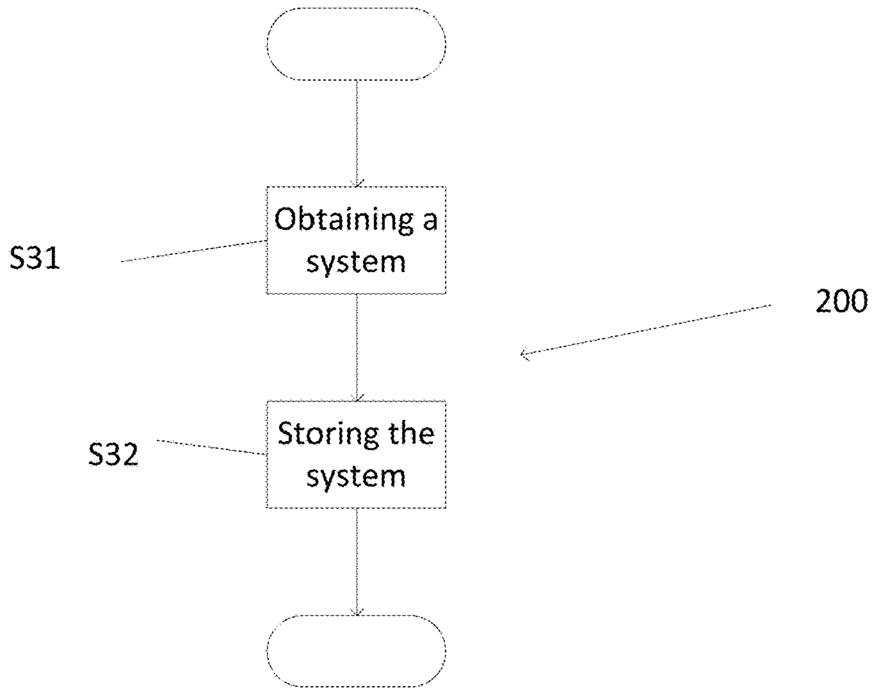
FIG. 9 shows a flow chart illustrating another example method according to the disclosure.

As described in more detail later in reference to FIG. 9 showing a method 200, configuration of the device 15 involves storing, e.g. at S32, the image retrieval system 1 at the device 15. In some examples, the image retrieval system 1 may be obtained at S31 (e.g. by generating the image retrieval system 1 as in the method 100 of FIG. 1). In some examples, obtaining the image retrieval system 1 at S31 may include receiving the image retrieval system 1 from another data source.

As described above, the image retrieval system 1 is derived from the training images 101 using the deep learning algorithm, and is arranged to produce an output corresponding to the cargo 11 of interest in the inspection image 1000. In some examples and as described in more detail below, the output may correspond to ranking a plurality of images of cargo from the dataset 20 of images. The dataset 20 may include at least one of: one or more training images 101 and a plurality of inspection images 1000.

The image retrieval system 1 is arranged to produce the output more easily, after it is stored in a memory 151 of the device 15 (as shown in FIG. 2), even though the process 100 for deriving the image retrieval system 1 from the training images 101 may be computationally intensive.

After it is configured, the device 15 may provide an accurate output corresponding to the cargo 11 by applying the image retrieval system 1 to the inspection image 1000. The raking process is illustrated (as process 300) in FIG. 10 (described later).

Computer System and Detection Device

FIG. 2 schematically illustrates an example computer system 10 and the device 15 configured to implement, at least partly, the example method 100 of FIG. 1. In particular, in one embodiment, the computer system 10 executes the deep learning algorithm to generate the image retrieval system 1 to be stored on the device 15. Although a single device 15 is shown for clarity, the computer system 10 may communicate and interact with multiple such devices. The training images 101 may themselves be obtained using images acquired using the device 15 and/or using other, similar devices and/or using other sensors and data sources.

Figure 4:
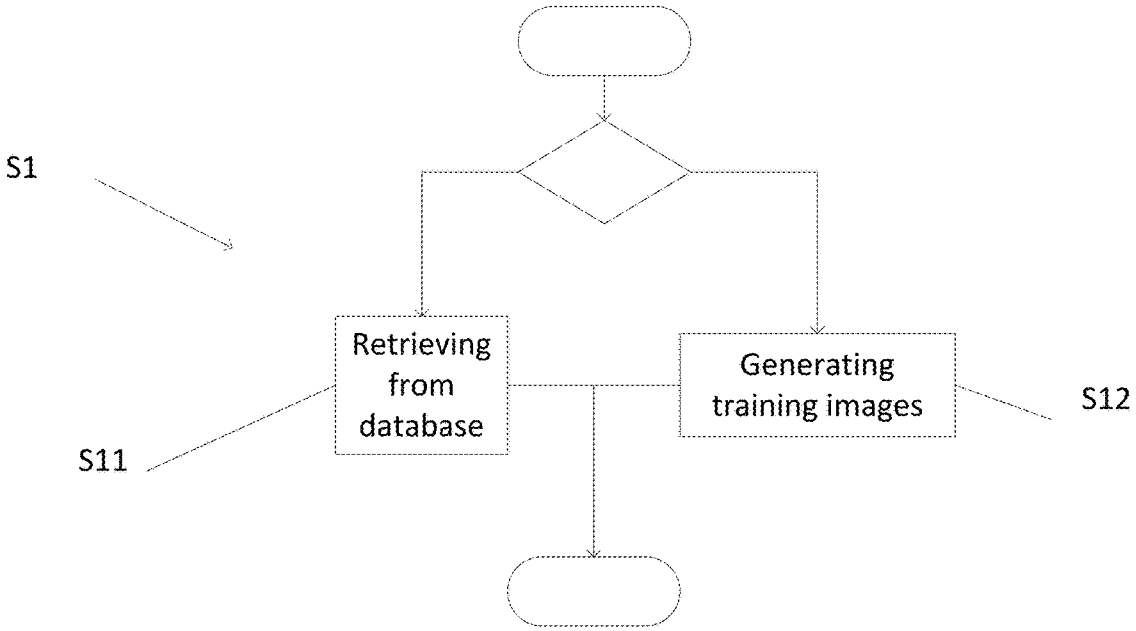
FIG. 4 shows a flow chart illustrating a detail of the example method of FIG. 1.

In some examples, as illustrated in FIG. 4, obtaining at S1 the training images 101 may include retrieving at S11 the annotated training images from an existing database of images (such as the dataset 20, in a non-limiting example). Alternatively or additionally, obtaining at S1 the training images 101 may include generating at S12 the annotated training images 101. In some examples, the generating at S12 may include:

irradiating, using penetrating radiation, one or more containers including cargo, and detecting radiation from the irradiated one or more containers.

In some examples the irradiating and/or the detecting are performed using one or more devices configured to inspect containers.

In some examples, the training images 101 may have been obtained in a different environment, e.g. using a similar device (or equivalent set of sensors) installed in a different (but preferably similar) environment, or in a controlled test configuration in a laboratory environment.

The computer system 10 of FIG. 2 includes a memory 121, a processor 12 and a communications interface 13.

The system 10 may be configured to communicate with one or more devices 15, via the interface 13 and a link 30 (e.g. Wi-Fi connectivity, but other types of connectivity may be envisaged).

The memory 121 is configured to store, at least partly, data, for example for use by the processor 12. In some examples the data stored on the memory 121 may include the dataset 20 and/or data such as the training images 101 (and the data used to generate the training images 101) and/or the deep learning algorithm.

Figure 10:
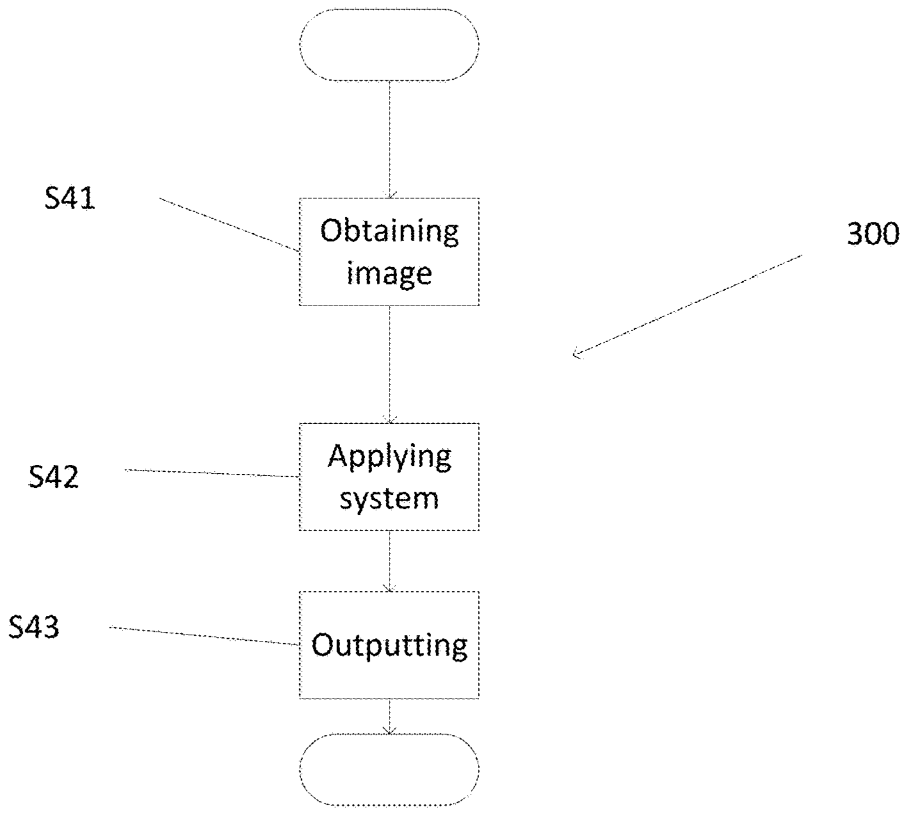
FIG. 10 shows a flow chart illustrating another example method according to the disclosure.

In some examples, the processor 12 of the system 10 may be configured to perform, at least partly, at least some of the steps of the method 100 of FIG. 1 and/or the method 200 of FIG. 9 and/or the method 300 of FIG. 10.

The detection device 15 of FIG. 2 includes a memory 151, a processor 152 and a communications interface 153 (e.g. Wi-Fi connectivity, but other types of connectivity may be envisaged) allowing connection to the interface 13 via the link 30.

In a non-limiting example, the device 15 may also include an apparatus 3 acting as an inspection system, as described in greater detail later. The apparatus 3 may be integrated into the device 15 or connected to other parts of the device 15 by wired or wireless connection.

In some examples, as illustrated in FIG. 2, the disclosure may be applied for inspection of a real container 4 containing the cargo 11 of interest. Alternatively or additionally, at least some of the methods of the disclosure may include obtaining the inspection image 1000 by irradiating, using penetrating radiation, one or more real containers 4 configured to contain cargo, and detecting radiation from the irradiated one or more real containers 4.

In other words the apparatus 3 may be used to acquire the plurality of training images 101 and/or to acquire the inspection image 1000.

In some examples, the processor 152 of the device 15 may be configured to perform, at least partly, at least some of the steps of the method 100 of FIG. 1 and/or the method 200 of FIG. 9 and/or the method 300 of FIG. 10.

Generating the Image Retrieval System

Referring back to FIG. 1, the image retrieval system 1 is built by applying a deep learning algorithm to the training images 101. Any suitable deep learning algorithm may be used for building the image retrieval system 1. For example, approaches based on convolutional deep learning algorithm may be used.

The image retrieval system 1 is generated based on the training images 101 obtained at S1.

The learning process is typically computationally intensive and may involve large volumes of training images 101 (such as several thousands or tens of thousands of images). In some examples, the processor 12 of the system 10 may include greater computational power and memory resources than the processor 152 of the device 15. The image retrieval system 1 generation is therefore performed, at least partly, remotely from the device 15, at the computer system 10. In some examples, at least steps S1 and/or S2 of the method 100 are performed by the processor 12 of the computer system 10. However, if sufficient processing power is available locally then the image retrieval system 1 learning could be performed (at least partly) by the processor 152 of the device 15.

The deep learning step involves inferring image features based on the training images 101 and encoding the detected features in the form of the image retrieval system 1.

The training images 101 are annotated, and each of the training images 101 is associated with an annotation indicating a type of the cargo 110 in the training image 101. In other words, in the training images 101, the nature of the cargo 110 is known. In some examples, a domain specialist may manually annotate the training images 101 with ground truth annotation (e.g. the type of the cargo for the image).

In some examples, the generated image retrieval system 1 is configured to detect at least one image in the dataset 20 of images, the at least one image including a cargo most similar to the cargo 11 of interest in the inspection image 1000. In some examples, a plurality of images of the dataset 20 is detected and ranked based on the similarity of their cargo with the cargo 11 of interest (e.g. the plurality may be ranked from a most similar to a least similar, or from a least similar to a most similar, as non-limiting examples).

In the disclosure, a similarity between cargos may be based on a Euclidean distance between features of the cargos.

As described in greater detail below, the Euclidean distance may be taken into account in a loss function $\mathcal{L}$ associated with the image retrieval system 1 applied to the training images 101.

As also described in greater detail below and shown in FIG. 2, the features of the cargos may be derived from one or more compact vectorial representations 21 of images (images such as the training images 101 and/or the inspection image 1000). In some examples, the one or more compact vectorial representations of the images may include at least one of a feature vector f, a matrix V of descriptors and a final image representation, FIR. In some examples, the one or more compact vectorial representations 21 of the images may be stored in the memory 121 of the system 10.

In other words, during the training performed at S2, the image retrieval system 1 is configured to learn a metric problem, so that the Euclidean distance captures the similarity between of features of the cargos.

During the training performed at S2, the image retrieval system 1 is associated with a parametric function a $\phi_\theta(\phi(I)\in\mathbb{R}^d)$, and the training performed at S2 enables the image retrieval system 1 to find a learnable parameter θ that minimizes the loss function $\mathcal{L}$ such that:

$$\min_\theta \sum_{i=1}^{N} \max\left(\|\phi_\theta(I_i^{anchor}) - \phi_\theta(I_i^{similar})\|_2^2 - \|\phi_\theta(I_i^{anchor}) - \phi_\theta(I_i^{different})\|_2^2 + \beta, 0\right) \quad \text{(E1)}$$

with: $I^{anchor}$, $I^{similar}$ and $I^{different}$ being three images, $I^{anchor}$, $I^{similar}$ and $I^{different}$ being such that $I^{similar}$ includes cargo similar to the cargo of an anchor image $I^{anchor}$, and $I^{different}$ includes cargo which is different from the cargo of the anchor image $I^{anchor}$, $\|\cdot\|_2$ being the Euclidean $I_2$ norm in $\mathbb{R}^d$, and d is a dimension of an image vectorial representation, and d may be chosen by an operator training the system, N being the number of images in the dataset of images, and β being a hyper-parameter that controls the margin between similar images and different images, and which can be chosen by the operator training the system.

Figure 5:
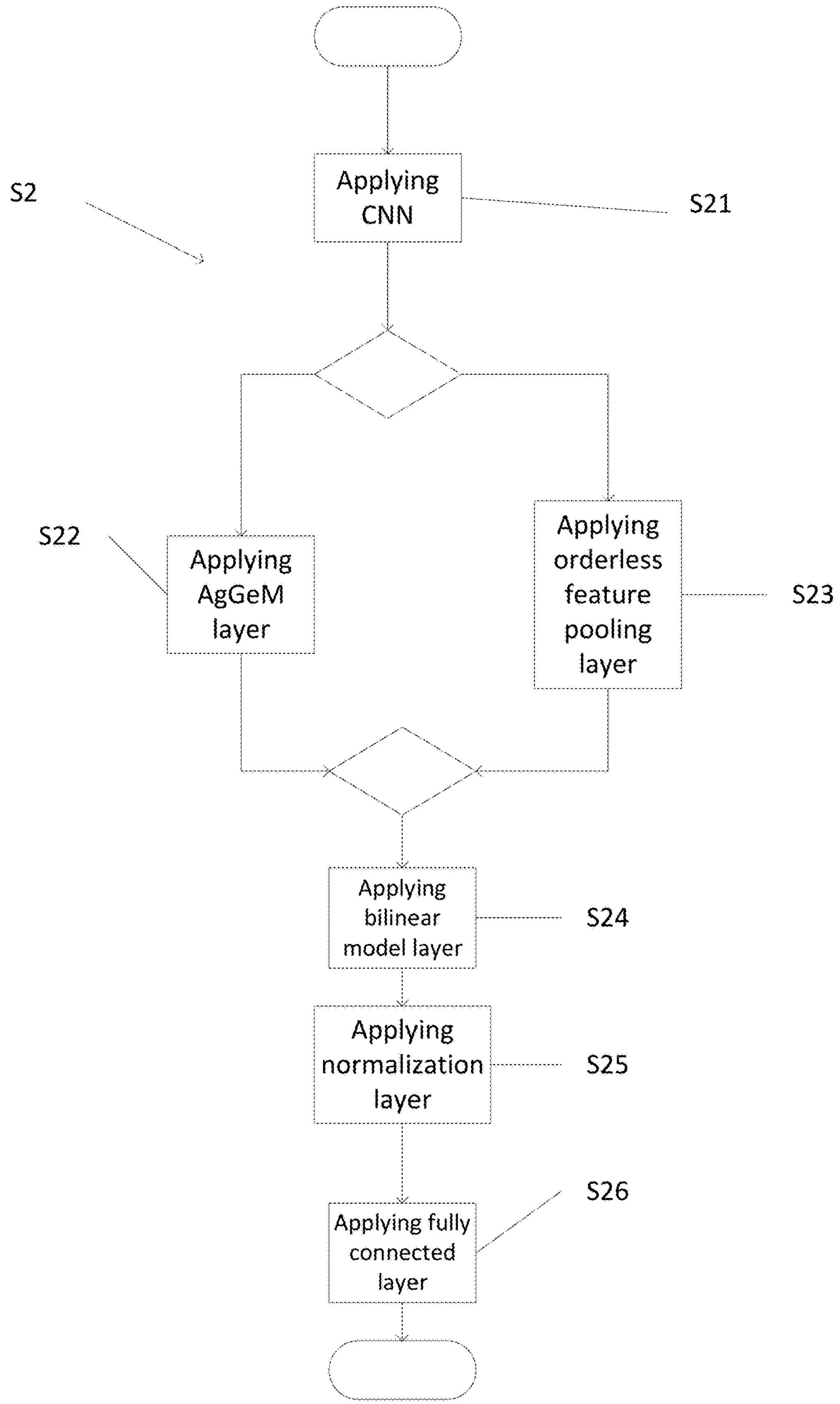
FIG. 5 shows a flow chart illustrating a detail of the example method of FIG. 1.

As illustrated in FIGS. 5 and 6, training at S2 the image retrieval system 1 includes applying, to the annotated training images 101, at S21, a feature extraction convolutional neural network 1001, referred to as CNN 1001, including a plurality of convolutional layers to generate a tensor $\mathcal{X}$ of image features.

The feature extraction CNN 1001 may include at least one of a CNN named AlexNet, VGG and ResNet, as non-limiting examples. In some examples the feature extraction CNN 1001 is fully convolutional.

Training at S2 the image retrieval system 1 also includes applying, to the generated tensor $\mathcal{X}$, at S22, an aggregated generalized mean, AgGeM, pooling layer 1002 associated with image spatial information.

Figure 7:
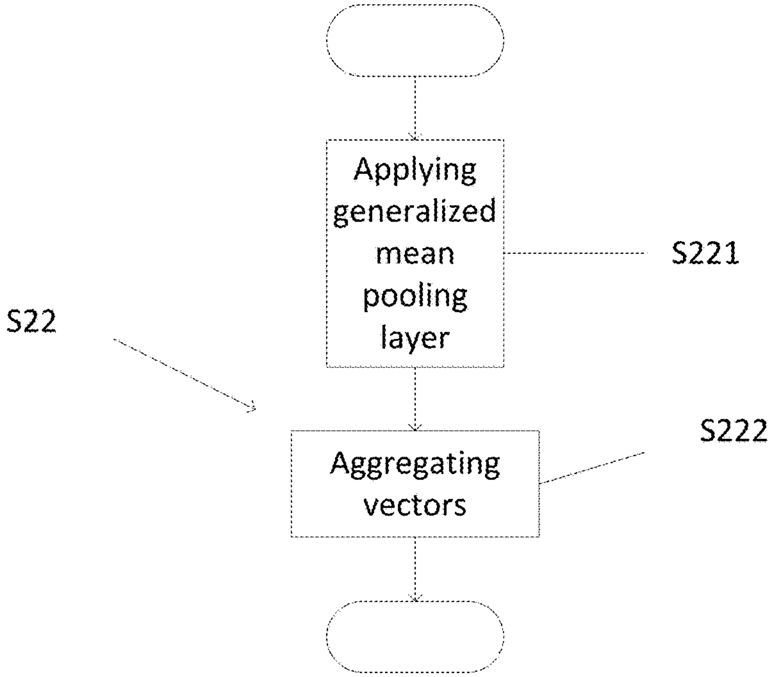
FIG. 7 shows a flow chart illustrating a detail of the example method of FIG. 1.

As illustrated in FIG. 7, the applying at S22 includes applying, at S221, a generalized mean pooling layer 1011, to generate a plurality of embedding vectors $(f^{(p)})_{p\in P}\in\mathbb{R}^K$, such that:

$$(f^{(p)})_p = [f_1^{(p)}, \ldots, f_K^{(p)}]$$

with:

$$f_k^{(p)} = \left(\frac{1}{|X_k|}\sum_{x\in X_k} x^p\right)^{\frac{1}{p}}$$

with:

P is a set of positive integers p representing pooling parameters of the generalized mean pooling layer, the tensor $\mathcal{X}=(\mathcal{X}_k)_{k\in\{1,\ldots,K\}}$ having H×W activations for a feature map k∈{1, . . . , K}, the feature map resulting from the application of the feature extraction CNN 1001 on an training image 101, with H and W being respectively a height and a width of each of the feature maps, K is a number of feature maps in a last convolutional layer of the feature extraction CNN 1001, x is a feature from the generated tensor $\mathcal{X}$, and $|\mathcal{X}_k|$ is a cardinal of $\mathcal{X}_k$ of the tensor $\mathcal{X}$.

The applying at S22 further includes, at S222, aggregating the generated plurality of embedding vectors $(f^{(p)})_{p531\ P}\in\mathbb{R}^K$ by applying weights α of a scoring layer 1012 associated with an attention mechanism to the plurality of embedding vectors $(f^{(p)})_{p\in P}\in\mathbb{R}^K$, for each pooling parameter p belonging to P, the weights α being such that:

$$\alpha(f^{(p)};\theta)$$

with:

the weights α and a parameter θ being learnable by the image retrieval system 1 to minimize the loss function $\mathcal{L}$.

The aggregating performed at S222 is configured to generate a feature vector f such that:

$$f = [f_1, \ldots, f_K]$$

with:

$$\forall k \in \{1, \ldots, K\},\ f_k = \sum_{p \in P} \alpha(f^{(p)}; \theta) \cdot f_k^{(p)}.$$

Referring back to FIGS. 5 and 6, training at S2 the image retrieval system 1 may include applying, to the generated tensor $\mathcal{X}$, at S23, an orderless feature pooling layer 1003 associated with image texture information.

Figure 8:
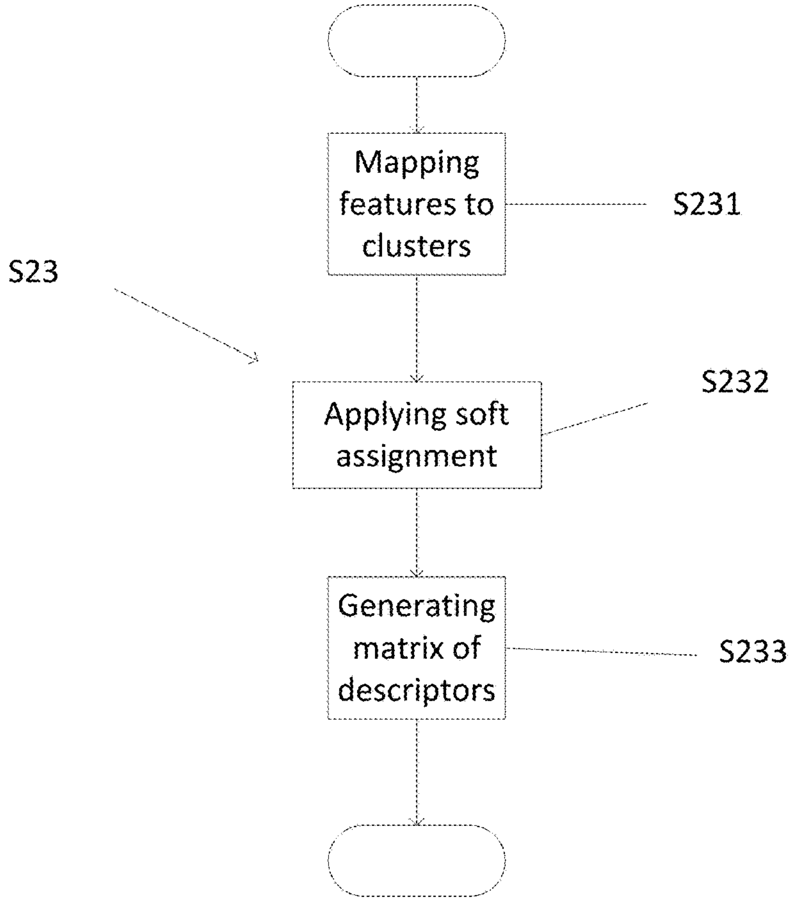
FIG. 8 shows a flow chart illustrating a detail of the example method of FIG. 1.

As illustrated in FIG. 8, applying at S23 the orderless feature pooling layer 1003 may include using a Gaussian mixture model, GMM, to generate orderless image descriptors of the image features.

The applying at S23 may include mapping, at S231, the image features $x_i$, $i \in \{1, \ldots, d\}$ of the tensor $\mathcal{X} = (\mathcal{X}_k)_{k \in \{1, \ldots, K\}}$ to a group of clusters of a Gaussian Mixture Model, with diagonal variances $\Sigma_k$ such that:

$$\forall k \in \{1, \ldots, K\},\ \sum_k = \frac{1}{\alpha_k} \cdot I_d.$$

with: $I_d$ being the d×d identity matrix, d=H×W being a dimension of the cluster k of $(\mathcal{X}_k)_{k \in \{1, \ldots, K\}}$, and $\alpha_k$ being a smoothing factor that represents the inverse of the variance $\Sigma_k$ in the $k^{th}$ cluster, $\alpha_k$ being learnable by the image retrieval system to minimize the loss function $\mathcal{L}$.

The applying at S23 may further include applying, at S232, a soft assignment algorithm by assigning weights $\overline{a}_k$ associated with the feature $x_i$, $i \in \{1, \ldots, d\}$, to the cluster k of centre $c_k$, such that:

$$\overline{a}_k(x_i) = \frac{e^{-\alpha_k \|x_i - c_k\|^2}}{\sum_{k'=1}^{K} e^{-\alpha_{k'} \|x_i - c_{k'}\|^2}}$$

with: $c_k$ being a vector representing the centre of the k-th cluster, $c_k$ being learnable by the image retrieval system to minimize the loss function $\mathcal{L}$, $c_{k'}$ is the same as $c_k$ for index k=k' ranging from 1 to K, M being a hyper-parameter representing a number of clusters to include in the group of the plurality of clusters of the Gaussian Mixture Model.

The applying at S23 may further include generating, at S233, a matrix V of descriptors, such that:

$$V = (\overline{a}_k(x_i))_{k \in \{1, \ldots, M\}; i \in \{1, \ldots, d\}} \in \mathbb{R}^{d \times M}.$$

The hyper-parameter M may be chosen by the operator training the system 1.

As illustrated in FIGS. 5 and 6, in some examples applying at S22 the aggregated generalized mean, AgGeM, pooling layer 1002 and applying at S23 the orderless feature pooling layer 1003, e.g. the GMM layer, may be performed in parallel.

As illustrated in FIGS. 5 and 6, the training at S2 may further include applying, at S24, a bilinear model layer 1004 to a combined output associated with the aggregated generalized mean pooling layer 1002 and the orderless feature pooling layer 1003.

In some examples, the bilinear model layer 1004 may be associated with a bilinear function $Y^{ts}$ such that:

$$Y^{ts} = \sum_{i=1}^{I} \sum_{j=1}^{J} \omega_{ij} a_i^t b_j^s$$

with: $a^t$ being a vector with a dimension I and associated with an output of the orderless feature pooling layer 1003, $b^s$ being a vector with a dimension J and associated with an output of the aggregated generalized mean pooling layer 1002, and ωij a weight configured to balance interaction between $a^t$ and $b^s$, ωij being learnable by the image retrieval system 1 to minimize the loss function $\mathcal{L}$.

As illustrated in FIG. 6, the vector $a^t$ may be obtained by applying an $\ell_2$ normalization layer 1005 and/or a fully connected layer 1006 to the matrix V of descriptors.

As illustrated in FIG. 6, the vector $b^s$ may be obtained by applying a normalization layer 1007, such as an $\ell_2$ normalization layer and/or a batch normalization layer, and/or a fully connected layer 1008 to the feature vector f.

As illustrated in FIGS. 5 and 6, S2 may further include applying at S25, to the combined output associated with the aggregated generalized mean pooling layer 1002 and the orderless feature pooling layer 1003, at least one normalization layer 1009, such as an $\ell_2$ normalization layer. Alternatively or additionally, S2 may further include applying at S26, to the combined output associated with the aggregated generalized mean pooling layer 1002 and the orderless feature pooling layer 1003, a fully connected layer 1010.

Applying at S25 the at least one normalization layer 1009 and/or applying at S26 the fully connected layer 1010 enables obtaining the final image representation FIR of the image.

In some examples, each of the training images 101 is further associated with a code of the Harmonised Commodity Description and Coding System, HS. The HS includes hierarchical sections and chapters corresponding to the type of the cargo in the training image 101.

In some examples, training at S2 the image retrieval system 1 further includes taking into account, in the loss function $\mathcal{L}$ of the image retrieval system 1, the hierarchical sections and chapters of the HS.

In some examples, the loss function $\mathcal{L}$ of the image retrieval system is such that:

$$\mathcal{L} = \sum_{i=1}^{N} \max\left(\left\|\phi_\theta(I_i^{anchor}) - \phi_\theta(I_i^{similar})\right\|_2^2 - \left\|\phi_\theta(I_i^{anchor}) - \phi_\theta(I_i^{different})\right\|_2^2 + \beta, 0\right) + \lambda \cdot \sum_{i=1}^{N} \max\left(\left\|\psi_\eta(h_i^{anchor}) - \psi_\eta(h_i^{similar})\right\|_2^2 - \left\|\psi_\eta(h_i^{anchor}) - \psi_\eta(h_i^{different})\right\|_2^2 + \delta, 0\right) \quad \text{(E1')}$$

with $$h_i^{anchor}$$

an HS code of a training image corresponding to a query, $$h_i^{similar}$$

an HS code of a training image sharing a same hierarchical section and/or hierarchical chapter with the training image corresponding to the query, $$h_i^{different}$$

an HS code of a training image having a different hierarchical section and/or hierarchical chapter from the training image corresponding to the query, $\psi_\eta$ being a parametric function associated with the image retrieval system 1, $\eta$ being a parameter learnable by the image retrieval system 1 to minimize the loss function $\mathcal{L}$, $\lambda$ being a parameter controlling an importance given to the hierarchical structure of the HS-codes during the training, and $\delta$ being a hyper-parameter that controls a margin between similar and different HS-codes, and which can be chosen by the operator training the system.

In some examples, training at S2 the image retrieval system 1 further includes applying a Hardness-aware Deep Metric Learning, HDML, algorithm.

Other architectures are also envisaged for the image retrieval system 1. For example, deeper architectures may be envisaged and/or an architecture of the same shape as the architecture shown in FIG. 6 that would generate vectors or matrices (such as the vector f, the matrix V, the vector $b^s$, the vector $a^t$ and/or the final image representation FIR) with sizes different from those already discussed may be envisaged.

Referring back to FIG. 6, the scoring layer 1012 of the AgGeM layer 1002 may include two convolutions and a softplus activation. In some examples a size of a last of the two convolutions may be lxi. Other architectures are also envisaged for the scoring layer 1012.

In some examples, each of the training images 101 is further associated with textual information corresponding to the type of cargo in the training image 101. In some examples, the textual information may include at least one of: a report describing the cargo (e.g. existing expert reports) and a report describing parameters of an inspection of the cargo (such as radiation dose, radiation energy, inspection device type, etc.).

Device Manufacture

As illustrated in FIG. 9, the method 200 of producing the device 15 configured to rank a plurality of images of cargo from a dataset of images generated using penetrating radiation, may include:

obtaining, at S31, an image retrieval system 1 generated by the method 100 according to any aspects of the disclosure; and storing, at S32, the obtained image retrieval system 1 in the memory 151 of the device 15.

The image retrieval system 1 may be stored, at S32, in the detection device 15. The image retrieval system 1 may be created and stored using any suitable representation, for example as a data description including data elements specifying ranking conditions and their ranking outputs (e.g. a ranking based on a Euclidean distance of image features with respect to image features of the query). Such a data description could be encoded e.g. using XML or using a bespoke binary representation. The data description is then interpreted by the processor 152 running on the device 15 when applying the image retrieval system 1.

Alternatively, the deep learning algorithm may generate the image retrieval system 1 directly as executable code (e.g. machine code, virtual machine byte code or interpretable script). This may be in the form of a code routine that the device 15 can invoke to apply the image retrieval system 1.

Regardless of the representation of the image retrieval system 1, the image retrieval system 1 effectively defines a ranking algorithm (including a set of rules) based on input data (i.e. the inspection image 1000 defining a query).

After the image retrieval system 1 is generated, the image retrieval system 1 is stored in the memory 151 of the device 15. The device 15 may be connected temporarily to the system 10 to transfer the generated image retrieval system (e.g. as a data file or executable code) or transfer may occur using a storage medium (e.g. memory card). In a preferred approach, the image retrieval system is transferred to the device 15 from the system 10 over the network connection 30 (this could include transmission over the Internet from a central location of the system 10 to a local network where the device 15 is located). The image retrieval system 1 is then installed at the device 15. The image retrieval system could be installed as part of a firmware update of device software, or independently.

Installation of the image retrieval system 1 may be performed once (e.g. at time of manufacture or installation) or repeatedly (e.g. as a regular update). The latter approach can allow the classification performance of the image retrieval system to be improved over time, as new training images become available.

Applying the Image Retrieval System to Perform Ranking

Ranking of images from the dataset 20 is based on the image retrieval system 1.

After the device 15 has been configured with the image retrieval system 1, the device 15 can use the image retrieval system 1 based on locally acquired inspection images 1000 to rank a plurality of images of cargo from the dataset 20 of images.

In some examples, the image retrieval system 1 effectively defines a ranking algorithm for extracting features from the query (i.e. the inspection image 1000), computing a distance of the features of the images of the dataset 20 with respect to the image features of the query, and ranking the images of the dataset 20 based on the computed distance.

In general, the image retrieval system 1 is configured to extract the features of the cargo 11 of interest in the inspection image 1000 in a way similar to the features extraction performed during the training at S2.

FIG. 10 shows a flow chart illustrating an example method 300 for ranking a plurality of images of cargo from the dataset 20 of images. The method 300 is performed by the device 15 (as shown in FIG. 2).

The method 300 includes:

obtaining, at S41, the inspection image 1000;

applying, at S42, to the obtained image 1000, the image retrieval system 1 generated by the method 100 according to any aspects of the disclosure; and ranking, at S43, a plurality of images of cargo from the dataset 20 of images, based on the applying.

It should be understood that in order to rank at S43 the plurality of images in the dataset 20, the device 15 may be connected, at least temporarily, to the system 10, and the device 15 may access the memory 121 of the system 10.

In some examples, at least a part of the dataset 20 and/or a part of the one or more compact vectorial representations 21 of images (such as the feature vector f, the matrix V of descriptors and/or the final image representation, FIR) may be stored in the memory 151 of the device 15.

In some examples, ranking at S43 the plurality of images includes outputting a ranked list of images including cargo corresponding to the cargo of interest in the inspection image.

In some examples, the ranked list may be a subset of the dataset 20 of images, such as 1 image of the dataset or 2, 5, 10, 20 or 30 images of the dataset, as non-limiting examples.

In some examples, ranking at S43 the plurality of images may further include outputting an at least partial code of the Harmonised Commodity Description and Coding System, HS, the HS including hierarchical sections and chapters corresponding to a type of cargo in each of the plurality of ranked images.

In some examples, ranking at S43 may further include outputting at least partial textual information corresponding to the type of cargo in each of the plurality of ranked images. In some examples, the textual information may include at least one of: a report describing the cargo and a report describing parameters of an inspection of the cargo.

Further Details and Examples

The disclosure may be advantageous but is not limited to customs and/or security applications.

The disclosure typically applies to cargo inspection systems (e.g. sea or air cargo).

The apparatus 3 of FIG. 2, acting as an inspection system, is configured to inspect the container 4, e.g. by transmission of inspection radiation through the container 4.

The container 4 configured to contain the cargo may be, as a non-limiting example, placed on a vehicle. In some examples, the vehicle may include a trailer configured to carry the container 4.

The apparatus 3 of FIG. 2 may include a source 5 configured to generate the inspection radiation.

The radiation source 5 is configured to cause the inspection of the cargo through the material (usually steel) of walls of the container 4, e.g. for detection and/or identification of the cargo. Alternatively or additionally, a part of the inspection radiation may be transmitted through the container 4 (the material of the container 4 being thus transparent to the radiation), while another part of the radiation may, at least partly, be reflected by the container 4 (called "back scatter").

In some examples, the apparatus 3 may be mobile and may be transported from a location to another location (the apparatus 3 may include an automotive vehicle).

In the source 5, electrons are generally accelerated under a voltage between 100 keV and 15 MeV.

In mobile inspection systems, the power of the X-ray source 5 may be e.g., between 100 keV and 9.0 MeV, typically e.g., 300 keV, 2 MeV, 3.5 MeV, 4 MeV, or 6 MeV, for a steel penetration capacity e.g., between 40 mm to 400 mm, typically e.g., 300 mm (12 in).

In static inspection systems, the power of the X-ray source 5 may be e.g., between 1 MeV and 10 MeV, typically e.g., 9 MeV, for a steel penetration capacity e.g., between 300 mm to 450 mm, typically e.g., 410 mm (16.1 in).

In some examples, the source 5 may emit successive X-ray pulses. The pulses may be emitted at a given frequency, between 50 Hz and 1000 Hz, for example approximately 200 Hz.

According to some examples, detectors may be mounted on a gantry, as shown in FIG. 2. The gantry for example forms an inverted "L". In mobile inspection systems, the gantry may include an electro-hydraulic boom which can operate in a retracted position in a transport mode (not shown on the Figures) and in an inspection position (FIG. 2). The boom may be operated by hydraulic actuators (such as hydraulic cylinders). In static inspection systems, the gantry may include a static structure.

It should be understood that the inspection radiation source may include sources of other penetrating radiation, such as, as non-limiting examples, sources of ionizing radiation, for example gamma rays or neutrons. The inspection radiation source may also include sources which are not adapted to be activated by a power supply, such as radioactive sources, such as using Co60 or Cs137. In some examples, the inspection system includes detectors, such as X-ray detectors, optional gamma and/or neutrons detectors, e.g., adapted to detect the presence of radioactive gamma and/or neutrons emitting materials within the cargo, e.g., simultaneously to the X-ray inspection. In some examples, detectors may be placed to receive the radiation reflected by the container 4.

In the context of the present disclosure, the container 4 may be any type of container, such as a holder or a box, etc. The container 4 may thus be, as non-limiting examples a palette (for example a palette of European standard, of US standard or of any other standard) and/or a train wagon and/or a tank and/or a boot of the vehicle and/or a "shipping container" (such as a tank or an ISO container or a non-ISO container or a Unit Load Device (ULD) container).

In some examples, one or more memory elements (e.g., the memory of one of the processors) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

As one possibility, there is provided a computer program, computer program product, or computer readable medium, including computer program instructions to cause a programmable computer to carry out any one or more of the methods described herein. In example implementations, at least some portions of the activities related to the processors may be implemented in software. It is appreciated that software components of the present disclosure may, if desired, be implemented in ROM (read only memory) form. The software components may, generally, be implemented in hardware, if desired, using conventional techniques.

Other variations and modifications of the system will be apparent to the skilled in the art in the context of the present disclosure, and various features described above may have advantages with or without other features described above.

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for generating an image retrieval system configured to rank a plurality of images of cargo from a dataset of images, in response to a query corresponding to an image of cargo of interest generated using penetrating radiation, the method comprising:

obtaining a plurality of annotated training images comprising cargo, each of the training images being associated with an annotation indicating a type of the cargo in the training image; and training the image retrieval system by applying a deep learning algorithm to the obtained annotated training images, the training comprising:

applying, to the annotated training images, a feature extraction convolutional neural network, CNN, comprising a plurality of convolutional layers to generate a tensor $\mathcal{X}$ of image features, and applying, to the generated tensor $\mathcal{X}$, an aggregated generalized mean, AgGeM, pooling layer associated with image spatial information, the applying comprising:

applying a generalized mean pooling layer, to generate a plurality of embedding vectors $(f^{(p)})_{p\in P}\in\mathbb{R}^K$, such that:

$$\left(f^{(p)}\right)_p = \left[f_1^{(p)}, \ldots, f_K^{(p)}\right]$$

with:

$$f_k^{(p)} = \left(\frac{1}{|\mathcal{X}_k|}\sum_{x\in\mathcal{X}_k} x^p\right)^{\frac{1}{p}}$$

with:

P is a set of positive integers p representing pooling parameters of the generalized mean pooling layer, the tensor $\mathcal{X}=(\mathcal{X}_k)_{k\in\{1, \ldots, K\}}$ having H×W activations for a feature map k∈{1, . . . , K}, the feature map resulting from the application of the feature extraction CNN on an training image, with H and W being respectively a height and a width of each of the feature maps, K is a number of feature maps in a last convolutional layer of the feature extraction CNN, x is a feature from the generated tensor $\mathcal{X}$, and $|\mathcal{X}_k|$ is a cardinal of $\mathcal{X}_k$ of the tensor $\mathcal{X}$, and aggregating the generated plurality of embedding vectors $(f^{(p)})_{p\in P}\in\mathbb{R}^K$ by applying weights α of a scoring layer associated with an attention mechanism to the plurality of embedding vectors $(f^{(p)})_{p\in P}\in\mathbb{R}^K$, for each pooling parameter p belonging to P, the weights α being such that:

$$\alpha\left(f^{(p)};\theta\right)$$

with the weights α and a parameter θ being learnable by the image retrieval system to minimize an associated loss function, wherein the aggregating is configured to generate a feature vector f such that:

$$f = [f_1, \ldots, f_K]$$

with $$\forall k\in\{1, \ldots, K\},\ f_k = \sum_{p\in\mathcal{P}}\alpha\left(f^{(p)};\theta\right)\cdot f_k^{(p)}.$$

2. The method of claim 1, wherein training the image retrieval system further comprises:

applying, to the generated tensor $\mathcal{X}$, an orderless feature pooling layer associated with image texture information, wherein applying the orderless feature pooling layer comprises using a Gaussian mixture model, GMM, to generate orderless image descriptors of the image features, the applying comprising:

mapping the image features $x_i$, i∈{1, . . . , d} of the tensor $\mathcal{X}=(\mathcal{X}_k)_{k\in\{1, \ldots, K\}}$ to a group of clusters of a Gaussian Mixture Model, with diagonal variances $\Sigma_k$ such that:

$$\forall k\in\{1, \ldots, K\},\ \Sigma_k = \frac{1}{\alpha_k}\cdot I_d.$$

with $I_d$ being the d×d identity matrix, d=H×W being a dimension of the cluster k of $(\mathcal{X}_k)_{k\in\{1, \ldots, K\}}$, and $\alpha_k$ being a smoothing factor that represents the inverse of the variance $\Sigma_k$ in the $k^{th}$ cluster, $\alpha_k$ being learnable by the image retrieval system to minimize the loss function, applying a soft assignment algorithm by assigning weights $\overline{a}_k$ associated with the feature $x_i$, i∈{1, . . . , d}, to the cluster k of centre $c_k$, such that:

$$\overline{a}_k(x_i) = \frac{e^{-\alpha_k\|x_i-c_k\|^2}}{\sum_{k'=1}^{K} e^{-\alpha_{k'}\|x_i-c_{k'}\|^2}}$$

with $c_k$ being a vector representing the centre of the k-th cluster, $c_k$ being learnable by the image retrieval system to minimize the loss function, $c_k$, is the same as $c_k$ for index k=k' ranging from 1 to K, M being a hyper-parameter representing a number of clusters to include in the group of the plurality of clusters of the Gaussian Mixture Model, and which can be chosen by an operator training the system, and generating a matrix V of descriptors, such that:

$$V=(\overline{a}_k(x_i))_{k\in\{1,..,M\};i\in\{1,..,d\}}\in\mathbb{R}^{d\times M}.$$

3. The method of claim 2, wherein applying the aggregated generalized mean pooling layer and applying the orderless feature pooling layer are performed in parallel.

4. The method of claim 3, wherein the training further comprises applying a bilinear model layer to a combined output associated with the aggregated generalized mean pooling layer and the orderless feature pooling layer, wherein the bilinear model layer is associated with a bilinear function $Y^{ts}$ such that:

$$Y^{ts}=\sum_{i=1}^{I}\sum_{j=1}^{J}\omega_{ij}a_i^t b_j^s$$

with $a^t$ being a vector with a dimension I and associated with an output of the orderless feature pooling layer, $b^s$ being a vector with a dimension J and associated with an output of the aggregated generalized mean pooling layer, and ωij a weight configured to balance interaction between $a^t$ and $b^s$, ωij being learnable by the image retrieval system to minimize the loss function.

5. The method of claim 4, wherein the vector $a^t$ is obtained by applying an $\ell_2$ normalization layer and/or a fully connected layer to the matrix V of descriptors.

6. The method of claim 4, wherein the vector $b^s$ is obtained by applying at least one of: i) an $\mathcal{L}_2$ normalization layer, ii) a batch normalization layer, and iii) a fully connected layer, as a normalization layer to the feature vector f.

7. The method of claim 3, further comprising applying, to a combined output associated with the aggregated generalized mean pooling layer and the orderless feature pooling layer, and in order to obtain a final image representation of an image, at least one of: i) an $\mathcal{L}_2$ normalization layer, and ii) a fully connected layer, as a normalization layer.

8. The method of claim 1, wherein each of the training images is further associated with a code of the Harmonised Commodity Description and Coding System, HS, the HS comprising hierarchical sections and chapters corresponding to the type of the cargo in the training image, and wherein training the image retrieval system further comprises taking into account, in the loss function associated with the image retrieval system, the hierarchical sections and chapters of the HS.

9. The method of claim 8, wherein the loss function $\mathcal{L}$ of the image retrieval system is such that:

$$\mathcal{L}=\sum_{i=1}^{N}\max\left(\left\|\phi_\theta(I_i^{anchor})-\phi_\theta(I_i^{similar})\right\|_2^2-\left\|\phi_\theta(I_i^{anchor})-\phi_\theta(I_i^{different})\right\|_2^2+\beta,0\right)+\lambda\cdot\sum_{i=1}^{N}\max\left(\left\|\psi_\eta(h_i^{anchor})-\psi_\eta(h_i^{similar})\right\|_2^2-\left\|\psi_\eta(h_i^{anchor})-\psi_\eta(h_i^{different})\right\|_2^2+\delta,0\right)$$

With $I^{anchor}$, $I^{similar}$ and $I^{different}$ being three images, $I^{anchor}$, $I^{similar}$ and $I^{different}$ being such that $I^{similar}$ comprises cargo similar to the cargo of an anchor image $I^{anchor}$, and $I^{different}$ comprises cargo which is different from the cargo of the anchor image $I^{anchor}$, $\|\cdot\|_2$ being the Euclidean $I_2$ norm in $\mathbb{R}^d$, and d is a dimension of an image vectorial representation, and d may be chosen by an operator training the system, N being the number of images in the dataset of images, β being a hyper-parameter that controls the margin between similar images and different images, and which can be chosen by an operator training the system, $$h_i^{anchor}$$

an HS code of a training image corresponding to a query, $$h_i^{similar}$$

an HS code of a training image sharing a same hierarchical section and/or hierarchical chapter with the training image corresponding to the query, $$h_i^{different}$$

an HS code of a training image having a different hierarchical section and/or hierarchical chapter from the training image corresponding to the query, $\psi_\eta$ being a parametric function associated with the image retrieval system, i being a parameter learnable by the image retrieval system to minimize the loss function $\mathcal{L}$, λ being a parameter controlling an importance given to the hierarchical structure of the HS-codes during the training, and δ being a hyper-parameter that controls a margin between similar and different HS-codes, and which can be chosen by the operator training the system.

10. The method of claim 1, wherein each of the training images is further associated with textual information corresponding to the type of cargo in the training image.

11. The method of claim 1, wherein the image retrieval system is configured to detect at least one image in the dataset of images comprising a cargo most similar to the cargo of interest in the inspection image, a similarity between cargos being based on a Euclidean distance between the cargos, the Euclidean distance being taken into account in a loss function of the image retrieval system applied to the training images.

12. The method according to claim 1, wherein the method is performed at a computer system separate from a device configured to inspect containers.

13. A method comprising:

obtaining an inspection image of cargo of interest generated using penetrating radiation, the inspection image corresponding to a query;

applying, to the inspection image, an image retrieval system generated by the method according to claim 1; and ranking a plurality of images of cargo from a dataset of images, based on the applying.

14. The method of claim 13, wherein ranking the plurality of images comprises outputting a ranked list of images comprising cargo corresponding to the cargo of interest in the inspection image.

15. The method of claim 13, wherein ranking the plurality of images further comprises outputting an at least partial code of the Harmonised Commodity Description and Coding System, HS, the HS comprising hierarchical sections and chapters corresponding to a type of cargo in each of the plurality of ranked images.

16. The method of claim 13, wherein ranking the plurality of images further comprises outputting at least partial textual information corresponding to the type of cargo in each of the plurality of ranked images.

17. A method of producing a device configured to rank a plurality of images of cargo from a dataset of images generated using penetrating radiation, the method comprising:

obtaining an image retrieval system generated by the method according to claim 1; and storing the obtained image retrieval system in a memory of the device.

18. The method according to claim 17, wherein the storing comprises transmitting the generated image retrieval system to the device via a network, the device receiving and storing the image retrieval system, or wherein the image retrieval system is generated, stored and/or transmitted in the form of one or more of:

a data representation of the image retrieval system;

executable code for applying the image retrieval system to one or more inspection images.

19. A device configured to rank a plurality of images of cargo from a dataset of images generated using penetrating radiation, the device comprising a memory storing an image retrieval system generated by the method according to claim 1.

20. A non-transitory computer-readable medium comprising instructions which, when executed by a processor, enable the processor to perform the method according to claim 1.

* * * * *